United States Patent
Rosen (10) Patent No.: US 10,769,047 B2
(45) Date of Patent: *Sep. 8, 2020

(54) STEPPING AND APPLICATION STATE VIEWING BETWEEN POINTS

(71) Applicant: MICROSOFT TECHNOLOGY LICENSING, LLC, Redmond, WA (US)

(72) Inventor: Douglas J. Rosen, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/169,684

(22) Filed: May 31, 2016

(65) Prior Publication Data
US 2016/0335167 A1  Nov. 17, 2016

Related U.S. Application Data

(63) Continuation of application No. 13/849,488, filed on Mar. 23, 2013, now Pat. No. 9,355,012, which is a
(Continued)

(51) Int. Cl.
G06F 11/36 (2006.01)

(52) U.S. Cl.
CPC ........ G06F 11/362 (2013.01); G06F 11/3624 (2013.01)

(58) Field of Classification Search
CPC .... G06F 11/36; G06F 11/362; G06F 11/3668; G06F 11/3664; G06F 11/3696
(Continued)

(56) References Cited

U.S. PATENT DOCUMENTS

| 5,124,989 A | 6/1992 | Padawer |
| 5,295,260 A | 3/1994 | Pribnow |

(Continued)

FOREIGN PATENT DOCUMENTS

| EP | 2023248 B1 * | 10/2018 | ............. G06F 21/62 |
| JP | 4491035 B2 * | 6/2010 | ............. G11B 27/36 |

OTHER PUBLICATIONS

Levrouw et al., "An Efficient Record-Replay Mechanism for Shared Memory Programs", 1992, IEEE (Year: 1992).*
(Continued)

*Primary Examiner* — Wei Y Zhen
*Assistant Examiner* — Junchun Wu
(74) *Attorney, Agent, or Firm* — Mannava & Kang, P.C.

(57) ABSTRACT

Various technologies and techniques are disclosed for providing stepping and state viewing in a debugger application. A start and end breakpoint are assigned. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. While in break mode, a playback feature is provided to allow a user to play back a path of execution that occurred between the start breakpoint and the end breakpoint. The playback feature uses at least some of the values that were stored with the logging feature to show how each referenced variable changed in value.

27 Claims, 7 Drawing Sheets

Related U.S. Application Data continuation of application No. 11/590,128, filed on Oct. 31, 2006, now Pat. No. 8,429,613.

(58) Field of Classification Search
USPC .......................................................... 717/124
See application file for complete search history.

(56) References Cited

U.S. PATENT DOCUMENTS

| | | | |
|---|---|---|---|
| 5,375,125 A | 12/1994 | Oshima | |
| 5,628,017 A * | 5/1997 | Kimmerly | G06F 9/542 717/127 |
| 5,784,552 A * | 7/1998 | Bishop | G06F 11/3664 714/38.12 |
| 5,845,125 A | 12/1998 | Nishimura | |
| 6,106,572 A | 8/2000 | Halpern | |
| 6,182,208 B1 | 1/2001 | Peri | |
| 6,263,456 B1 | 7/2001 | Boxall | |
| 6,418,543 B1 | 7/2002 | Goli | |
| 6,543,049 B1 | 4/2003 | Bates | |
| 6,922,821 B1 | 7/2005 | Nemecek | |
| 7,072,800 B1 | 7/2006 | Fernandez et al. | |
| 7,305,665 B2 * | 12/2007 | Koseki | G06F 8/441 717/140 |
| 7,337,433 B2 | 2/2008 | Cyran | |
| 7,647,631 B2 | 1/2010 | Sima | |
| 7,890,466 B2 * | 2/2011 | Kundu | G06F 16/2358 707/648 |
| 8,015,549 B2 * | 9/2011 | Cooper | G06F 11/362 717/124 |
| 8,090,989 B2 | 1/2012 | Law | |
| 8,136,096 B1 * | 3/2012 | Lindahl | G06F 11/3636 717/129 |
| 8,347,267 B2 * | 1/2013 | Givoni | G06F 11/3414 717/124 |
| 9,268,666 B2 * | 2/2016 | Law | G06F 11/3644 |
| 2002/0038168 A1 * | 3/2002 | Kasuga | G06F 3/0481 700/245 |
| 2002/0087949 A1 * | 7/2002 | Golender | G06F 11/323 717/124 |
| 2002/0087950 A1 | 7/2002 | Brodeur | |
| 2002/0100032 A1 * | 7/2002 | Metzgen | G06F 17/5045 717/154 |
| 2002/0174415 A1 | 11/2002 | Hines | |
| 2003/0142122 A1 | 7/2003 | Straut et al. | |
| 2003/0172198 A1 * | 9/2003 | Tiwary | G06F 11/3414 710/1 |
| 2004/0059809 A1 | 3/2004 | Benedikt | |
| 2004/0064351 A1 | 4/2004 | Mikurak | |
| 2004/0210876 A1 | 10/2004 | Stall | |
| 2004/0255278 A1 * | 12/2004 | Bates | G06F 11/3664 717/129 |
| 2004/0268310 A1 | 12/2004 | Morgan | |
| 2005/0010908 A1 * | 1/2005 | Funk | G06F 11/3648 717/124 |
| 2005/0066312 A1 * | 3/2005 | Barsness | G06F 11/362 717/129 |
| 2005/0108689 A1 | 5/2005 | Hooper | |
| 2005/0216792 A1 | 9/2005 | Tsuboi | |
| 2005/0229154 A1 | 10/2005 | Hiew et al. | |
| 2005/0251794 A1 * | 11/2005 | Taylor | G06F 11/3664 717/148 |
| 2006/0101405 A1 * | 5/2006 | Buschardt | G06F 11/3636 717/124 |
| 2006/0130016 A1 * | 6/2006 | Wagner | G06F 9/4812 717/136 |
| 2006/0206873 A1 | 9/2006 | Argade | |
| 2007/0234298 A1 | 10/2007 | Hirai | |
| 2007/0276692 A1 * | 11/2007 | Mei | G06F 11/3664 717/125 |
| 2008/0052683 A1 | 2/2008 | Bates et al. | |
| 2008/0120605 A1 * | 5/2008 | Rosen | G06F 11/362 717/129 |
| 2008/0288558 A1 * | 11/2008 | De Pauw | G06F 11/3636 707/999.202 |
| 2011/0296246 A1 | 12/2011 | Cooper | |
| 2011/0321017 A1 * | 12/2011 | Kapoor | G06F 11/362 717/129 |
| 2012/0089410 A1 | 4/2012 | Mikurak | |
| 2012/0317550 A1 * | 12/2012 | Lindahl | G06F 11/3636 717/128 |

OTHER PUBLICATIONS

Spinellis, "Debuggers and Logging Frameworks", 2006, IEEE (Year: 2006).*
Agrawal et al., "Debugging with Dynamic Slicing and Back tracking", Jun. 1993, Software-Practice and Experience, vol. 23(6), pp. 589-616 (Year: 1993).*
Maruyama et al., "Debugging with Reverse Watchpoint", 2003, IEEE (Year: 2003).*
Bhansali et al., "Framework for Instruction-level Tracing and Analysis of Program Executions", Jun. 2006, ACM (Year: 2006).*
Chen et al., "Reversible Debugging Using Program Instrumentation", Aug. 2001, IEEE, vol. 27, No. 8 (Year: 2001).*
Lewis, "Debugging Backwards in Time", Oct. 9, 2003, Lambda Computer Science.
Vermeulen et al., "Automatic Generation of Breakpoint Hardware for Silicon Debug", Jun. 7-11, 2004, ACM.
Buck et al., "An API for Runtime Code Patching", Winter 2000, The International Journal of High Performance Computing Applications, vol. 14, No. 4, pp. 317-329.
Boothe, "Efficient Algorithms for Bidirectional Debugging", In Proceedings of the ACM SIGPLAN Conference on Programming Language Design and Implementation, Jun. 18-21, 2000.
Thomas Moher, "PROVIDE: A Process Visualization and Debugging Environment", ! EEE, Jun. 1988, vol. 14 No. 6, 1988.
Lewis, "Debugging Backwards in Time", In Proceedings of the 5th International Workshop on Automated and Algorithmic Debugging, Oct. 2003.
Yasushi Saito, "Jockey: A User-space Library for Record-replay Debugging", Sep. 2005, AADEBUG '05: p. 69-76.
Agrawal, "An Execution, Backtracking Approach to Debugging", May 1991.
Boothe, A Fully Capable Bidirectional Debugger, Jan. 2000, p. 36, vol. 25, No. 1.
Moher, "PROVIDE: A Process Visualization and Debugging Environment", IEEE Transactions on Software Engineering, Jun. 1988.
Saito, "Jockey: A User-Space Library for Record-Replay Debugging", In Proceedings of the 6th International Symposium on Automated and Analysis-Driven Debugging, Sep. 19-21, 2005.

* cited by examiner

```
WINDOWSAPPLICATION2                                                    [-][x]
FILE  EDIT  VIEW  PROJECT  BUILD  DEBUG  DATA  TOOLS  WINDOW  COMMUNITY  HELP
START PAGE | FORM1.VB* | FORM1.VB [DESIGN]*
(GENERAL)                          ▼    (DECLARATIONS)                    ▼

PUBLIC CLASS FORM1
    PRIVATE SUB CMDPRESSME_CLICK (SENDER AS SYSTEM.OBJECT, E AS SYSTEM.EVENTARGS)
    HANDLES CMD PRESSME.CLICK
        DIM INTAGE AS INTEGER         484
        DIM INTRETIREMENT AS INTEGER   ↙
        INTAGE = INPUTBOX ("ENTER YOUR AGE", "AGE?")
        INTRETIREMENT = 65 - INTAGE
        MSGBOX ("YOU ONLY HAVE" & INTRETIREMENT & " YEARS UNTIL RETIREMENT")
        IF INTRETIREMENT < 10 THEN
            STARTSAVING()
        END IF  ← 488
    END SUB
    PRIVATE SUB STARTSAVING ()
        MSGBOX ("YOU BETTER START SAVING YOUR MONEY IF YOU HAVEN'T ALREADY!")
    END SUB
  END CLASS
```

STEPPING AND APPLICATION STATE VIEWING BETWEEN POINTS

RELATED APPLICATIONS

This Application is a Continuation of and claims benefit from U.S. patent application Ser. No. 13/849,488 that was filed Mar. 23, 2013, and that is a Continuation of U.S. patent application Ser. No. 11/590,128 (U.S. Pat. No. 8,429,613), filed Oct. 31, 2006 (issued Apr. 23, 2013), each of which is incorporated herein by reference in its entirety.

BACKGROUND

Most software development tools such as MICROSOFT® Visual Studio have debuggers that allow the software developer to debug the code and enter break mode at a particular point in time to watch the code execution more carefully to locate an error. When a debugger breaks into the code in break mode when an exception occurs, it is not very easy to determine what caused the exception because the changes to the data and the path of execution through the application are not remembered by the debugger or the platform. Some debuggers have attempted to solve this problem by just recording every activity that happens during execution, such as recording every data value as it changes and the entire execution path. The problem with such an approach is that there is a huge overhead involved in recording every activity for an entire application as the values change and as every execution path is taken.

SUMMARY

Various technologies and techniques are disclosed for providing stepping and state viewing in a debugger application. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint. More lines of source code are executed until the end breakpoint is reached. When the end breakpoint is reached, the debugger is put into break mode. In one implementation, the logging feature stops logging when break mode is entered.

While in break mode, a playback feature is provided to allow a user to play back a path of execution that occurred between the start breakpoint and the end breakpoint. The playback feature uses at least some of the values that were stored with the logging feature to show how each referenced variable changed in value. In one implementation, the playback is bidirectional, allowing the user to move forward and/or backward in time to play back how the values and/or state of the application changed. In one implementation, as playback occurs, the user is able to see the current and ending values of each referenced variable, such as in a locals window.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a software development application that provides debugging features, but the system also serves other purposes in addition to these. In one implementation, one or more of the techniques described herein can be implemented as features within a software development program such as MICROSOFT® Visual Studio, or from any other type of program or service that allows for debugging the operation of software. A start breakpoint and an end breakpoint are assigned, such as by a user and/or programmatically. Source code execution begins, and upon reaching the start breakpoint, a logging feature begins storing one or more values that may be impacted upon execution of code between the start breakpoint and an end breakpoint, along with the source locations visited. The phrase "values that may be impacted" as used herein is meant to include any values or states that could be touched and/or changed by code that executes between the start breakpoint and end breakpoint (whether or not the value or state actually changed). Non-limiting examples of "values that may be impacted" include referenced variables in a particular function. The phrase "source location" is meant to include all the source locations visited during the execution of the application between the start and end breakpoint, regardless of whether or not a variable change takes place at that location. These source locations are then used to assist in playing back a path of execution later. More lines of source code are executed until the end breakpoint is reached. When the end breakpoint is reached, the debugger is put into break mode. While in break mode, a playback feature is provided to allow a user to play back the path of execution that occurred between the start breakpoint and the end breakpoint, and/or to view how the referenced variable values changed.

Figure 1:
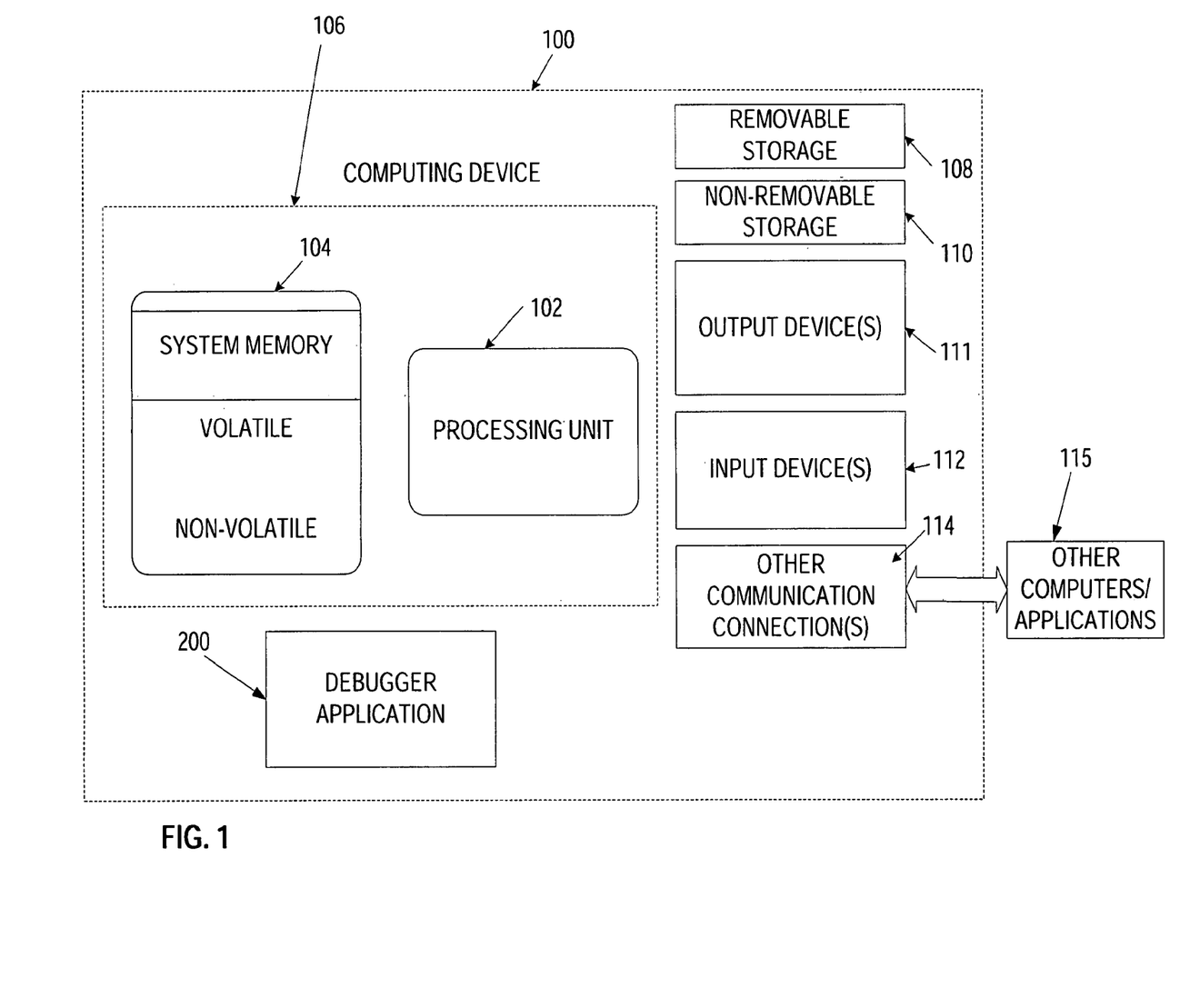
FIG. 1 is a diagrammatic view of a computer system of one implementation.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100. Further, the terms "computer storage device" and "computer storage media" and the like as used herein strictly refer to an apparatus(es) or article(s) of manufacture or the like.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes debugger application 200. Debugger application 200 will be described in further detail in FIG. 2.

Figure 2:
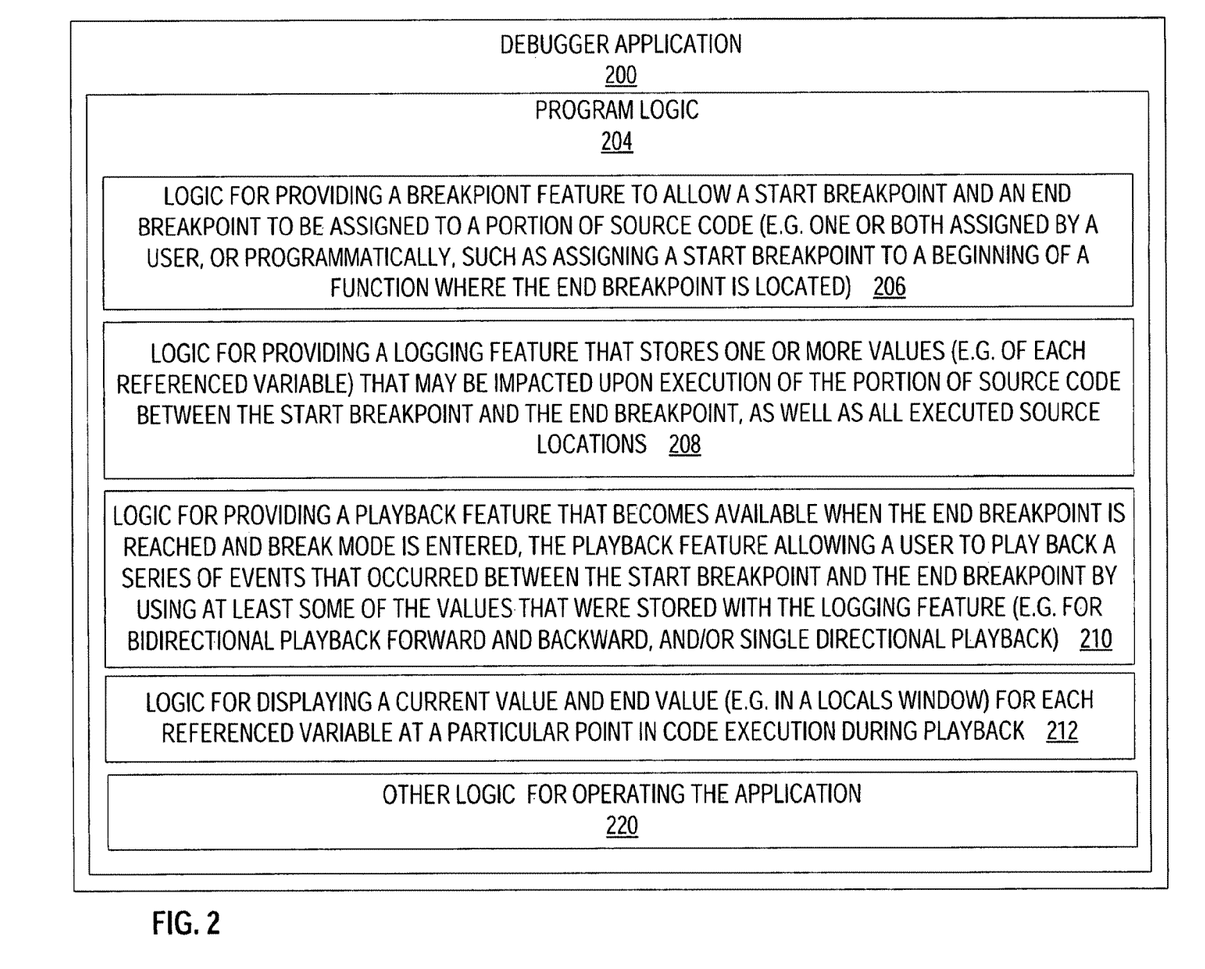
FIG. 2 is a diagrammatic view of a debugger application of one implementation operating on the computer system of FIG. 1.

Turning now to FIG. 2 with continued reference to FIG. 1, debugger application 200 operating on computing device 100 is illustrated. Debugger application 200 is one of the application programs that reside on computing device 100. However, it will be understood that debugger application 200 can alternatively or additionally be embodied as computer-executable instructions on one or more computers and/or in different variations than shown on FIG. 1. Alternatively or additionally, one or more parts of debugger application 200 can be part of system memory 104, on other computers and/or applications 115, or other such variations as would occur to one in the computer software art.

Debugger application 200 includes program logic 204, which is responsible for carrying out some or all of the techniques described herein. Program logic 204 includes logic for providing a breakpoint feature to allow a start breakpoint and an end breakpoint to be assigned to a portion of source code (e.g. one or both assigned by a user, or programmatically, such as assigning a start breakpoint to a beginning of a function where the end breakpoint is located) 206; logic for providing a logging feature that stores one or more values (e.g. of each referenced variable) that may be impacted upon execution of the portion of source code between the start breakpoint and the end breakpoint, as well as all executed source locations 208; logic for providing a playback feature that becomes available when the end breakpoint is reached and break mode is entered, the playback feature allowing a user to play back a path of execution that occurred between the start breakpoint and the end breakpoint by using at least some of the values that were stored with the logging feature (e.g. for bidirectional playback forward and backward, and/or single directional playback) 210; logic for displaying a current value and an end value (e.g. in a locals window) for each referenced variable at a particular point in code execution during playback 212; and other logic for operating the application 220. In one implementation, program logic 204 is operable to be called programmatically from another program, such as using a single call to a procedure in program logic 204.

Figure 3:
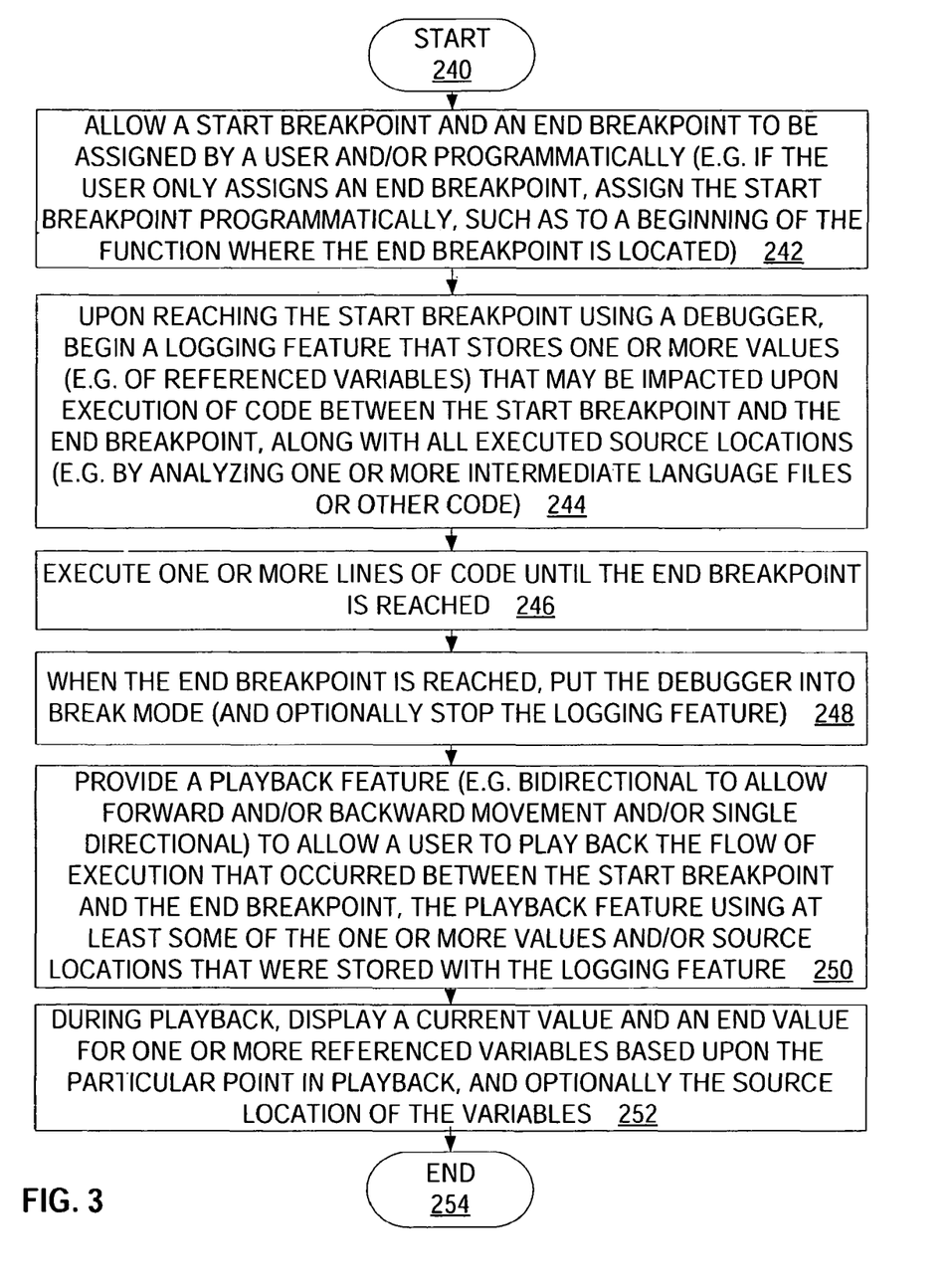
FIG. 3 is a process flow diagram for one implementation of the system of FIG. 1 illustrating the stages involved in providing a stepping and state viewing debugger.
Figure 4:
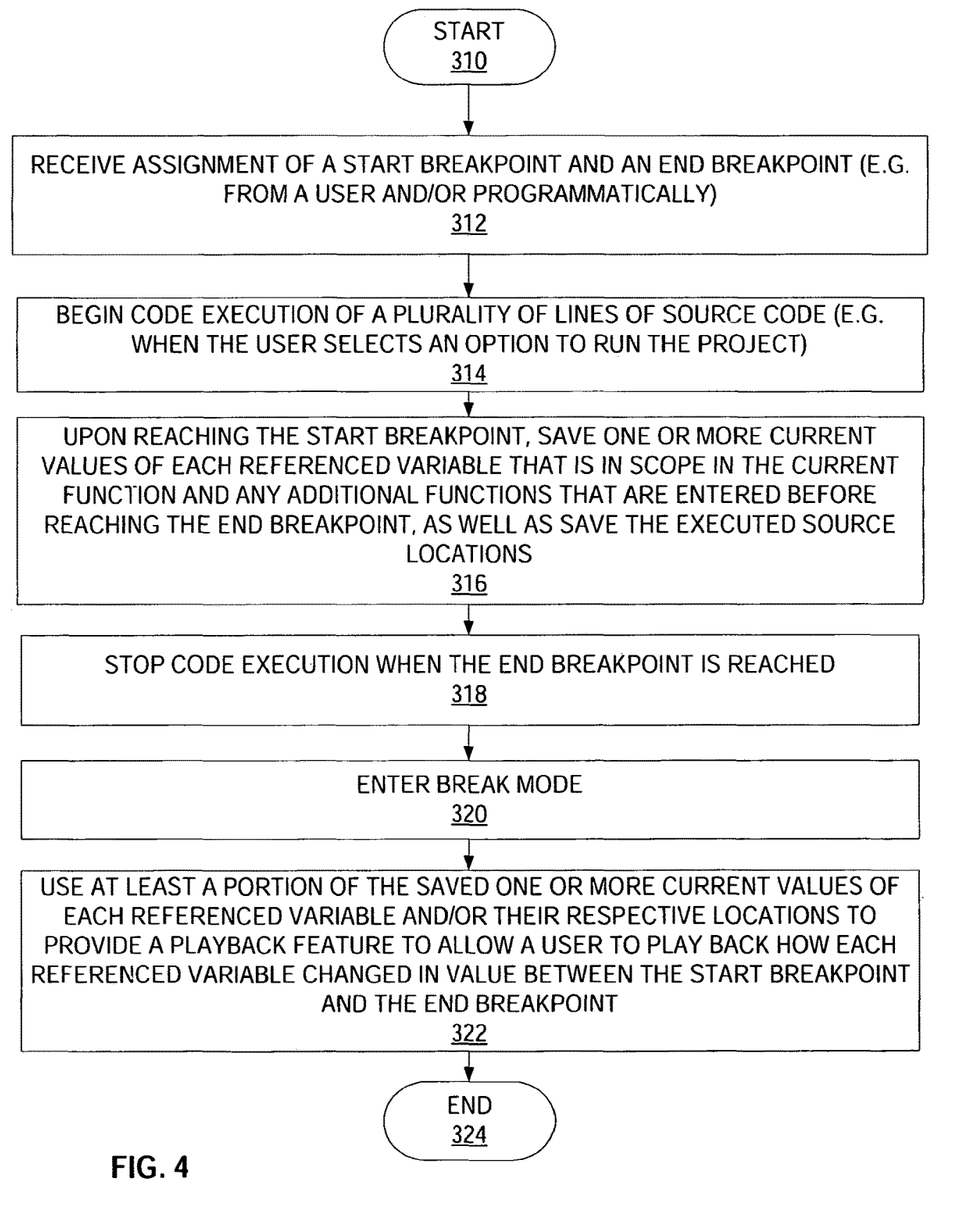
FIG. 4 is a process flow diagram for one implementation of the system of FIG. 1 illustrating the stages involved in using the stepping and state viewing debugger to debug an application.
Figure 5:
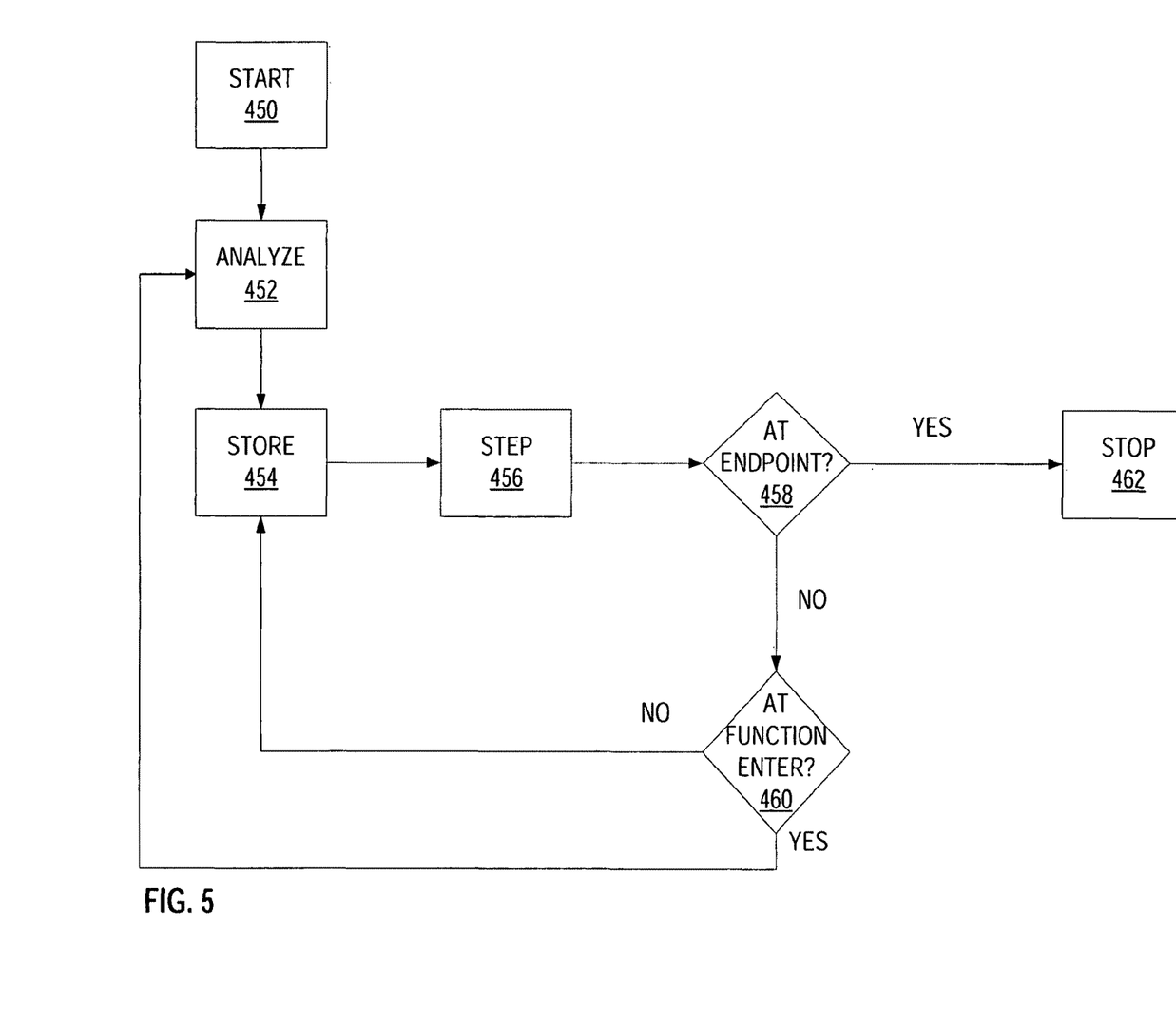
FIG. 5 is a process flow diagram for one implementation of the system of FIG. 1 illustrating the stages involved in providing the logging feature for analyzing and recording values and the source locations visited between the start and end breakpoints.

Turning now to FIGS. 3-5 with continued reference to FIGS. 1-2, the stages for implementing one or more implementations of debugger application 200 are described in further detail. FIG. 3 is a process flow diagram for debugger application 200 illustrating the stages involved in providing a stepping and state viewing debugger. In one form, the process of FIG. 3 is at least partially implemented in the operating logic of computing device 100. The procedure begins at start point 240 with allowing a start breakpoint and an end breakpoint to be assigned by a user and/or programmatically (e.g. if the user only assigns an end breakpoint, assign the start breakpoint programmatically, such as to a beginning of the function where the end breakpoint is located) (stage 242). Upon reaching the start breakpoint using a debugger, begin a logging feature that stores one or more values (such as referenced values) that may be impacted upon execution of code between the start breakpoint and the end breakpoint, along with all executed source locations (stage 244). A few non-limiting examples of referenced values that may be impacted include local variables in scope and/or each variable reference present in a current function. In one implementation, one or more intermediate language files or other code or other code are analyzed to help determine which values may change (stage 244). One or more lines of code are executed until the end breakpoint is reached (stage 246).

When the end breakpoint is reached, the debugger is put into break mode (and optionally stop the logging feature) (stage 248). A playback feature (e.g. bidirectional to allow forward and/or backward movement, and/or single directional) is provided to allow a user to play back a path of execution that occurred between the start breakpoint and the end breakpoint (stage 250). In one implementation, a start option, stop option, and slider option are used to control this playback in one or more directions. The playback feature uses at least some of the one or more values and/or the executed source locations that were stored with the logging feature (stage 250). During playback, a current value and an ending value are displayed, such as in a locals window, for one or more referenced variables based upon the particular point in playback (stage 252). In one implementation, the source location of each of the one or more referenced variables is also displayed (stage 252). The process ends at end point 254.

FIG. 4 illustrates one implementation of the stages involved in using the stepping and state viewing debugger to debug an application. In one form, the process of FIG. 4 is at least partially implemented in the operating logic of computing device 100. The procedure begins at start point 310 with receiving assignment of a start breakpoint and an end breakpoint (e.g. from a user and/or programmatically) (stage 312). Code execution is started for a plurality of lines of source code (e.g. when the user selects an option to run the project) (stage 314). Upon reaching the start breakpoint, one or more current values are saved for each referenced variable that is in scope in the current function and any additional functions that are entered before reaching the end breakpoint (stage 316). The executed source locations are also saved (stage 316). Code execution is stopped when the end breakpoint is reached (stage 318), and break mode is then entered (stage 320). Using at least a portion of the saved one or more current values of each referenced variable and/or the executed source locations, a playback feature is provided to allow a user to play back how each referenced variable changed in value between the start breakpoint and the end breakpoint (e.g. forward and/or backward) (stage 322). The process ends at end point 324.

FIG. 5 illustrates one implementation of the stages involved in providing the logging feature to analyze and record values between the start and end breakpoints. In one form, the process of FIG. 5 is at least partially implemented in the operating logic of computing device 100. The procedure begins at start point 450 with the code execution reaching the start breakpoint. The intermediate language code of the current function is analyzed (stage 452). The intermediate language is scanned for any field references, which are stored (stage 454). Any referenced variables that are in scope are inspected to get their values and are stored along with the values of the previously discovered field references (stage 454). In one implementation, one goal is to store only the values of those variables that may be touched by the code to be executed, as opposed to a complete dump of the heap.

A source level step is then executed (stage 456) to execute the next line of source code. When the step completes, the debugger application 200 checks to see if the instruction pointer is at the end breakpoint (decision point 458). If the instruction pointer is not at the end breakpoint (decision point 458), then the debugger application 200 checks to see if another function was entered. If another function was entered (decision point 460), then the intermediate language code of the current function is analyzed (stage 452) and the field reference values and referenced variable values are stored (stage 454). Another step is then taken to execute the next line of source code (stage 456). If another function was not entered (decision point 460), then the referenced variables that are in scope along with the current values for the field references are stored (stage 454). Once the instruction pointer is at the end breakpoint (decision point 458), then the system is put into break mode (stage 462) and the process ends.

Figure 6:
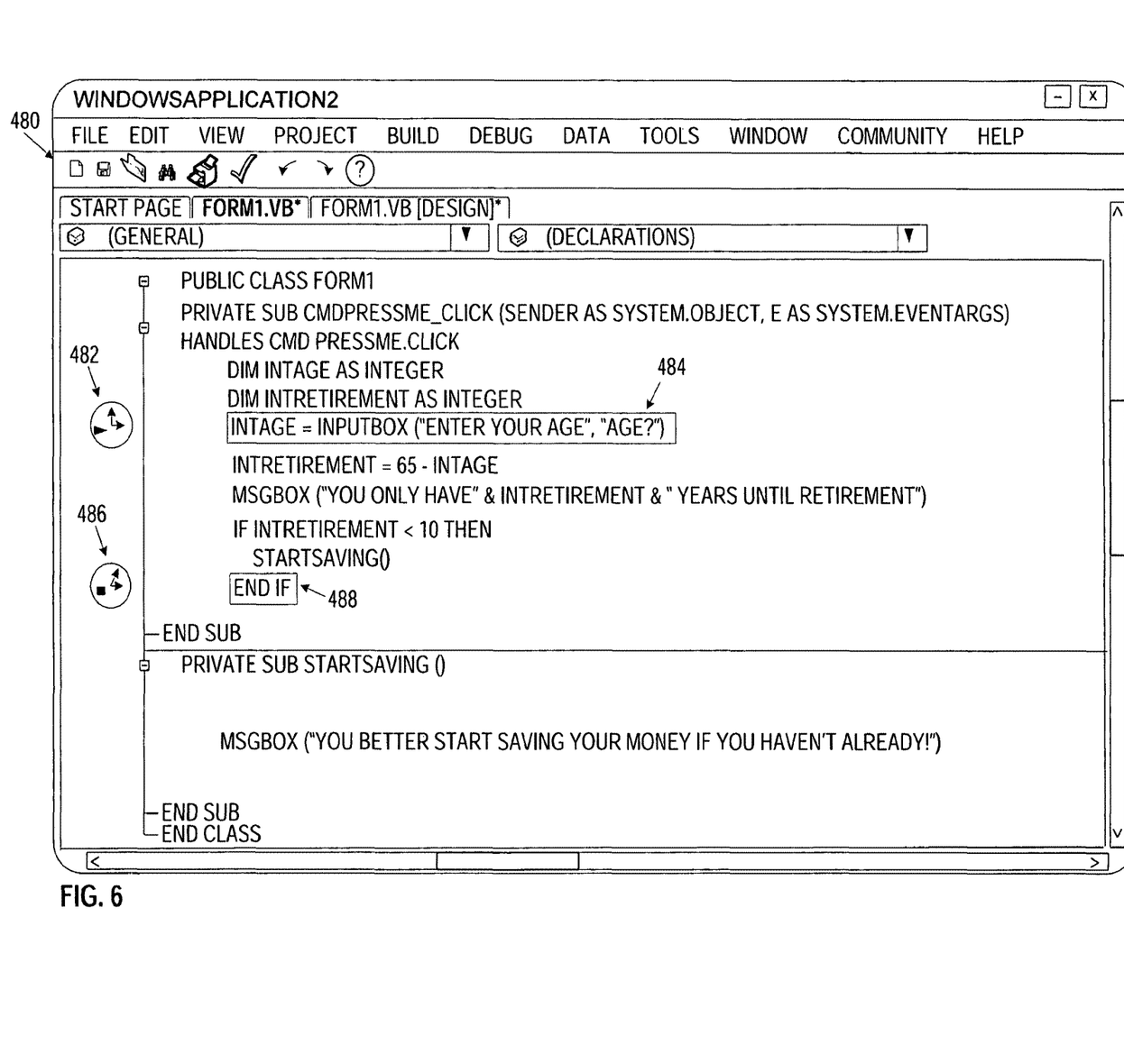
FIG. 6 is a simulated screen for one implementation of the system of FIG. 1 that illustrates setting start and end breakpoints in a debugger.
Figure 7:
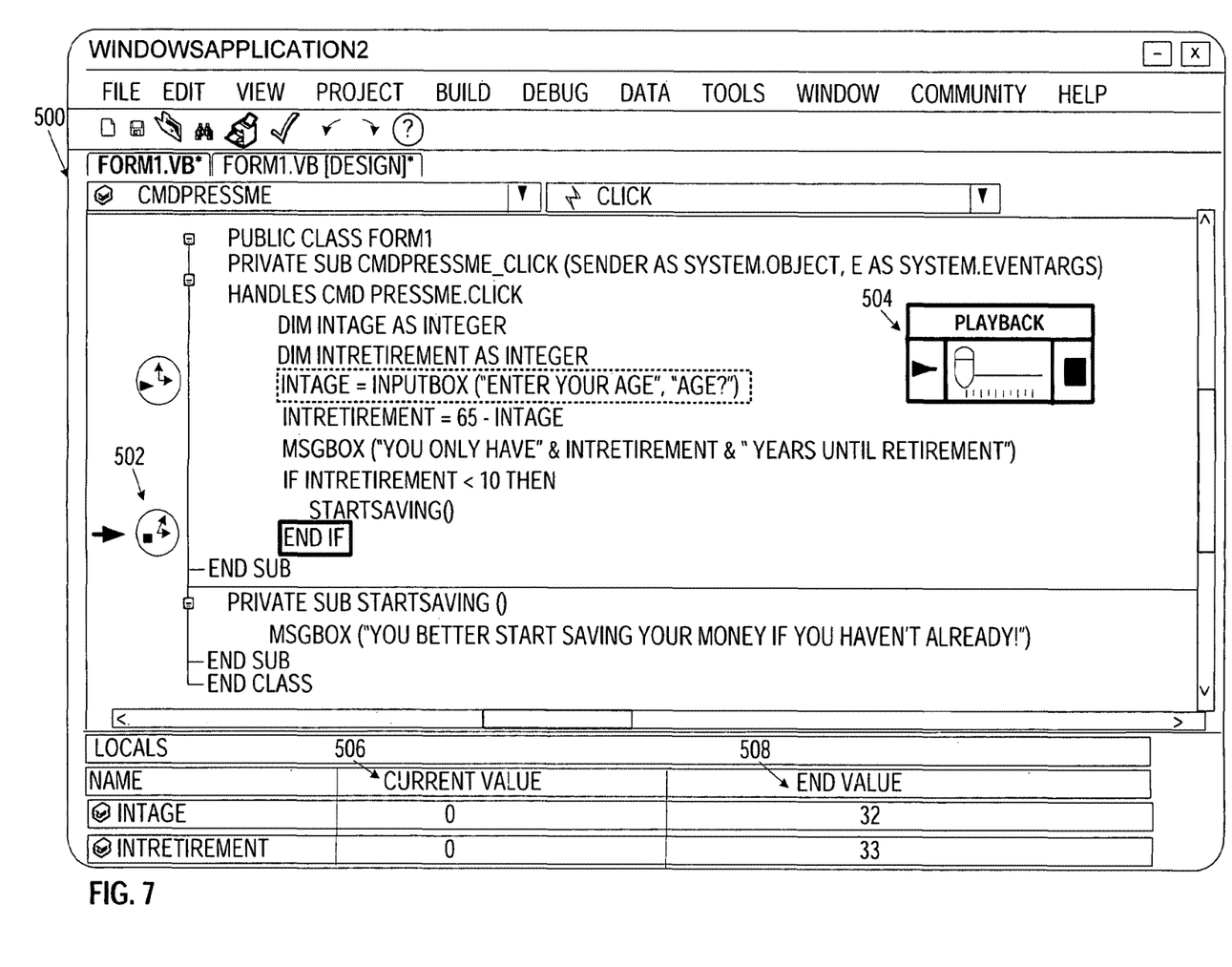
FIG. 7 is a simulated screen for one implementation of the system of FIG. 1 that illustrates entering debug mode upon hitting a start breakpoint.

Turning now to FIGS. 6 and 7, simulated screens are shown to illustrate the stepping and state viewing of debugger application 200 as described in FIGS. 2-5 in further detail. FIG. 6 is a simulated screen 480 for one implementation of the system of FIG. 1 that illustrates setting start and end breakpoints in a debugger. Start breakpoint 482 has been assigned to code line 484, and end breakpoint 486 has been assigned to code line 488. Turning now to FIG. 7, simulated screen 500 illustrates that when end breakpoint 502 (486 on FIG. 6) is reached, debugger application 200 breaks into debug mode. Using the playback toolbar 504, the user can then specify to start or stop the playback, as well as to jump forward or backward in the execution timeline (e.g. using the slider or other feature). As the playback is manipulated, the locals window displays the current value 506 and the end value 508 for each of the referenced variables. This allows the user to see what the current value for the variable based on the current line of code being executed, and what that value was when the function ended. In one implementation, the locals window also displays where in the source code the program was at that point in time (e.g. the respective source location of the particular referenced variable).

In one implementation, by using the playback feature, the user can move the instruction pointer back in time to see the execution path through the function and see the values of important data and how it changed as execution occurred. In one implementation, by only saving the values that the user has deemed interesting (e.g. those affected between the start and end breakpoints), a reasonable level of performance is achieved while allowing the user to have more helpful debugging features.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method of debugging code performed on a computing device, the method comprising:

debugging a portion of code by logging, by the computing device, the portion of code located between a start breakpoint and an end breakpoint assigned in the code as the portion of the code is executed, where the logging includes storing a value of a variable that is determined from execution of the logged portion of the code in a memory from which the value of the variable is accessible for playback of the portion of the code, and where the start breakpoint represents a point in code execution where logging of executing code begins and the end breakpoint represents a point in code execution where execution and logging stops.

2. The method of claim 1 further comprising jumping backward, by the computing device in response to user input, in an execution path of the executed code.

3. The method of claim 1 where the execution of the code stops upon reaching the end breakpoint.

4. The method of claim 1 further comprising playing back at least some of the logged portion of the code.

5. The method of claim 4 where the playing back comprises stepping forward or backward through at least some of the logged portion of the code.

6. The method of claim 4 where the playing back comprises displaying the stored value of the variable.

7. The method of claim 1, wherein the variable is expressed in the portion of the code, and the value of the variable is calculated from execution of a function also expressed in the portion of code.

8. A computing device comprising:

at least one processor; and memory that is coupled to the at least one processor and that includes computer-executable instructions that, based on execution by the at least one processor, configure the computing device to perform actions comprising:

debugging a portion of code by logging, by the computing device, the portion of code located between a start breakpoint and an end breakpoint assigned in the code as the portion of the code is executed, where the logging includes storing a value of a variable that is determined from execution of the logged portion of the code in a memory from which the value of the variable is accessible for playback of the portion of the code, and where the start breakpoint represents a point in code execution where logging of executing code begins and the end breakpoint represents a point in code execution where execution and logging stops.

9. The computing device of claim 8 where the value of variable is stored upon execution of the code reaching the start breakpoint and each time the value changes prior to execution of the code reaching the end breakpoint.

10. The computing device of claim 8 where the execution of the code stops upon reaching the end breakpoint.

11. The computing device of claim 8, the actions further comprising playing back at least some of the logged portion of the code.

12. The computing device of claim 11 where the playing back comprises stepping forward or backward through at least some of the logged portion of the code.

13. The computing device of claim 11 where the playing back comprises displaying at least some of the stored values of the variables.

14. The computing device of claim 8, wherein the variable is expressed in the portion of the code, and the value of the variable is calculated from execution of a function also expressed in the portion of code.

15. At least one hardware computer storage device storing computer-executable instructions that, based on execution by at least one processor of a computing device, configure the computing device to perform actions comprising:

debugging a portion of code by logging, by the computing device, the portion of code located between a start breakpoint and an end breakpoint assigned in the code as the portion of the code is executed, where the logging includes storing a value of a variable that is determined from execution of the logged portion of the code in a memory from which the value of the variable is accessible for playback of the portion of the code, and where the start breakpoint represents a point in code execution where logging of executing code begins and the end breakpoint represents a point in code execution where execution and logging stops.

16. The at least one hardware computer storage device of claim 15 where the value of variable is stored upon execution of the code reaching the start breakpoint and each time the value changes prior to execution of the code reaching the end breakpoint.

17. The at least one hardware computer storage device of claim 15 where the execution of the code stops upon reaching the end breakpoint.

18. The at least one hardware computer storage device of claim 15, the actions further comprising playing back at least some of the logged portion of the code.

19. The at least one hardware computer storage device of claim 18 where the playing back comprises stepping forward through at least some of the logged portion of the code, or where the playing back comprises stepping backward through at least some of the logged portion of the code.

20. The at least one hardware computer storage device of claim 18 where the playing back comprises displaying at least some of the stored values of the variables.

21. The at least one hardware computer storage device of claim 15, wherein the variable is expressed in the portion of the code, and the value of the variable is calculated from execution of a function also expressed in the portion of code.

22. A method of debugging performed on a computing device, the method comprising:

debugging a portion of code by logging, by the computing device during execution of the portion of code located between a start point and an end point, where the logging includes storing a value of a variable expressed in the portion of the code in a memory from which the value of the variable is accessible for playback of the portion of the code, and the value of the variable is calculated from execution of a function also expressed in the portion of code, where the value of the variable is logged regardless of whether or not the value changes as the portion of code is executed, and where the start point represents a point in code execution where logging of executing code begins and the end point represents a point in code execution where execution and logging stops, and jumping, by the computing device based on user input, backward in an execution path of the portion of executed code.

23. The method of claim 22 where the logging further comprises logging the portion of the code located between the start point and the end point as the portion of the code is executed.

24. The method of claim 22 where the start point and the end point are breakpoints assigned in the code.

25. The method of claim 22 where the jumping is performed as part of playing back at least some of the logged portion of the executed code.

26. The method of claim 25 where the playing back comprises displaying the stored value of the variable.

27. The method of claim 25 where the playing back comprises stepping forward or backward through at least some of the logged portion of the code.

* * * * *